Oct. 4, 1966 E. R. HANSZ 3,276,115

METHOD OF MAKING SHAFT SEALS

Filed April 3, 1963 2 Sheets-Sheet 1

INVENTOR.
EDWARD R. HANSZ
BY
Everett H. Wright
ATTORNEY

Oct. 4, 1966   E. R. HANSZ   3,276,115
METHOD OF MAKING SHAFT SEALS
Filed April 3, 1963   2 Sheets-Sheet 2

INVENTOR.
EDWARD R. HANSZ
BY
ATTORNEY

United States Patent Office 3,276,115
Patented Oct. 4, 1966

3,276,115
METHOD OF MAKING SHAFT SEALS
Edward R. Hansz, Bloomfield Township, Oakland County, Mich., assignor to Michigan Precision Molded, Inc., Walled Lake, Mich., a corporation of Michigan
Filed Apr. 3, 1963, Ser. No. 270,259
1 Claim. (Cl. 29—527)

This invention relates to and has for its primary object an improved method of making shaft seals such as oil seals and the like comprising a metal ring or shell having an axially and radially disposed flange and a rubber or synthetic rubber sealing element molded thereto, the said sealing element being molded to the shell in such a manner as to eliminate or accurately control flash at the annular peripheral portion of the axially disposed flange of the shell as well as at the radially disposed flange of said shell whereby to eliminate the usual flash trimming operation.

A further object of the invention is to provide the method of flashless molding of a rubber or synthetic rubber shaft seal to the radially and axially disposed flanges of an annular metal shell in a die having a fixed and a movable die element formed with the desired molding cavity therein comprising the forming of the radially disposed flange of the annular shell to an obtuse angle with respect to the axially disposed flange thereof, preferably from 10 degrees to 45 degrees below or greater than the normal right angle disposition of the said annular radially disposed shell flange with respect to said annular axially disposed shell flange, placing the said shell in the fixed die element with the inner annular bottom portion of said obtusely disposed flange in shell-to-die contact with said fixed die element and with the axially disposed flange in substantial contact with said fixed die element, placing a charge of moldable material in said fixed die element, partially closing said die bringing the movable element thereof in die-to-shell contact with the peripheral portion or edge of said axially disposed flange of said annular shell and partially filling the mold cavity, continuing to close said die reforming the obtusely disposed flange of said shell to its final radially disposed position by applying die pressure during the completion of the closing of the said die to the peripheral edge portion of the axially disposed flange of said shell and fluid pressure through said moldable material within the mold cavity to the inner faces of said radially and axially disposed shell flanges to accomplish flashless or substantially flashless molding of the said shaft seal to the axial and annular flanges of said shell.

Other objects of the invention will become apparent by reference to the following detailed description taken in connection with the accompanying drawings, in which.

Figure 1:
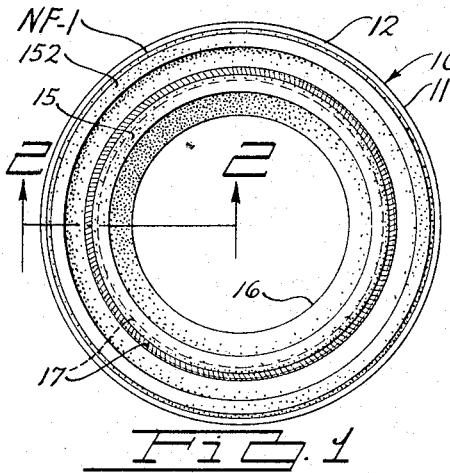
FIG. 1 is a top plan view of a typical shaft seal produced according to the method of the invention.

Referring now to the drawings wherein like reference characters refer to like and corresponding parts throughout the several views, the invention is herein disclosed and illustrated in connection with a shaft seal 10 which may be considered typical of the type of shaft seal that may be produced in accordance with the instant invention without flash at the axially outer edge portions of the axially and radially disposed flanges of the annular metal shell thereof.

This invention is an improvement over the Method of Making Shaft Seals of Edward E. Blaurock disclosed and claimed in his application Serial No. 270,257, filed April 3, 1963, the instant invention relating essentially to a shaft seal wherein anchorage flanges of the sealing element are molded in anchored relationship to the entire inner surface of the shaft seal shell while the obtusely preformed radially disposed flange of the shaft seal shell is reformed by means of both die closing pressure and fluid pressure of the moldable material within the die cavity as the die is closed.

Figure 2:
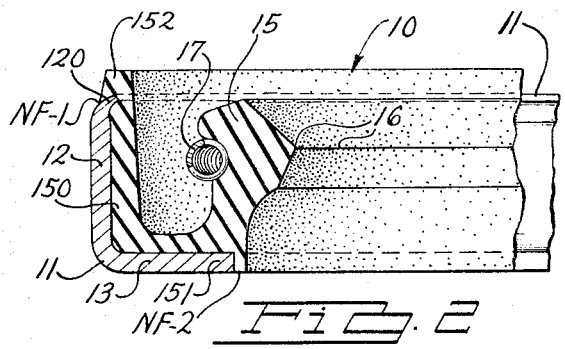
FIG. 2 is an enlarged fragmentary sectional view taken on the line 2—2 of FIG. 1.

The shaft seal 10 in connection with which the invention is illustrated is composed of an annular shell 11 having an axially disposed flange 12 and a radially disposed flange 13. A rubber or synthetic rubber sealing element 15 has anchorage flanges 150 and 151 molded to the inner annular faces of the said shell flanges 12 and 13 respectively as best shown in FIG. 2. After the sealing element 15 has been molded to the shell 12, an excess of molded material E is attached to the sealing element 15, see FIG. 6. The annular shell 11 with the sealing element 15 securely molded thereto is removed from the molding dies 30 and 40, and the excess molded material E is trimmed from the sealing element 15 along the line X—X of FIG. 6, thus finishing the shaft seal 10 with the annular oil seal lip 16 of the sealing element 15 completely formed as best shown in FIG. 2.

It is of course contemplated that other shaft seals generally similar to the shaft seal 10 may be produced according to the method steps of the invention, such other seals may be of different detail and proportions, and the molded sealing element thereof may include both oil seal and dust seal lips as ofttimes provided in shaft seal designs.

Figure 3:
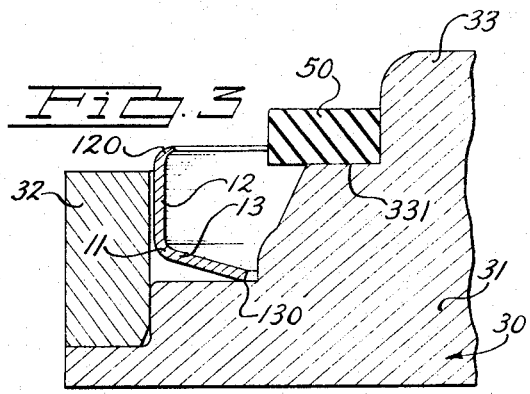
FIG. 3 is a more or less diagrammatic sectional view of a fixed die with the shaft seal shell positioned therein showing the obtuse formation of the radial flange of the shaft seal shell and the preferred placement in the mold of a charge of moldable rubber or synthetic rubber compound.
Figure 6:
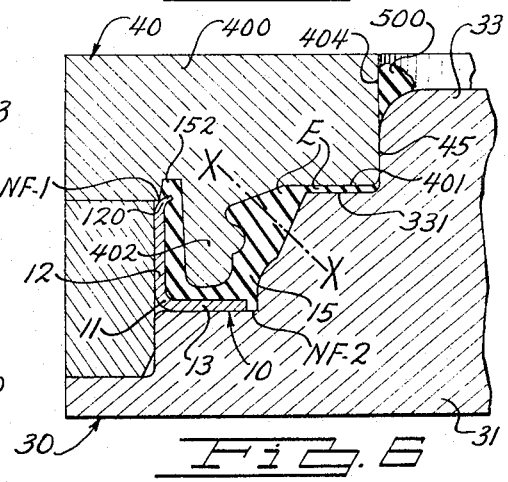
FIG. 6 is a view similar to FIG. 5 showing the die closed and with the radial flange of the shaft seal completely reformed to its finished radially disposed position.
Figure 7:
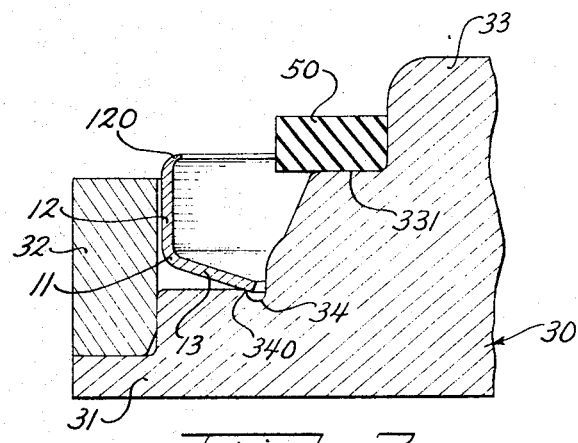
FIG. 7 is a view similar to FIG. 3 showing the fixed die element provided with a suitable annular groove therein to provide a circular bearing thereon for the bottom of the obtusely disposed radial flange of the shaft seal shell adjacent its inner annular edge as the said flange is reformed to its finished radially disposed position during the molding operation.
Figure 8:
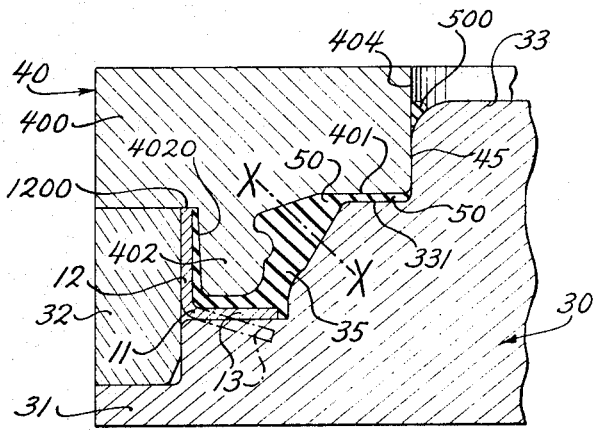
FIG. 8 is a die closed view similar to FIG. 6 showing a flat annular rather than a curled formation of the outer peripheral edge of the axially disposed flange of the annular seal shell, the molded rubber or synthetic rubber sealing element terminating thereat.

In the production of shaft seals 10 in accordance with the instant invention, the axially disposed flange 12 of the annular shell 11 is preferably inwardly curled at 120 as shown in FIGS. 2–7 inclusive, or the said shell 11 may have a straight or flat annular edge at 1200 as shown in FIG. 8. The radially disposed flange 13 of the shell 11 is preformed on an obtuse angle in respect to the axially disposed flange 12 thereof. As shown in FIG. 3, the shell 11 is then placed in a fixed molding die 30 on the lower annular base element 31 thereof within an annular shell centering ring 32. The annular lower edge 130 of the said obtusely preformed radially disposed flange 13 of the shell 11 bears with high unit pressure on the lower annular base element 31 of the fixed die 30 as the molding dies 30 and 40 are closed. The central portion of the fixed die 30 is provided with a central guide stem 33 and an annular shelf 34 on which is placed an annular ring or charge of moldable material 50.

Figure 5:
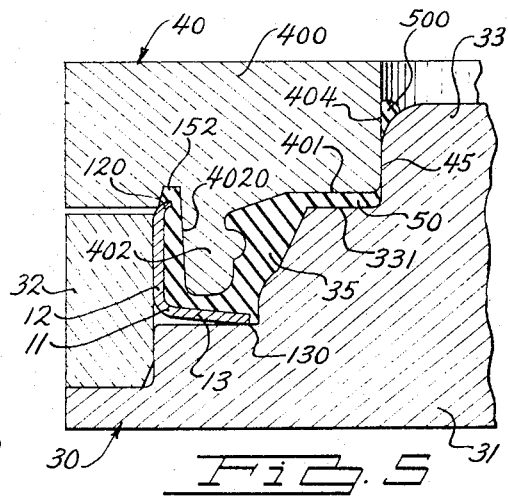
FIG. 5 is a view similar to FIG. 4 showing the movable die further advanced, the mold cavity filled, and with the radial flange of the shaft seal shell partially reformed toward its finished radially disposed position.
Figure 4:
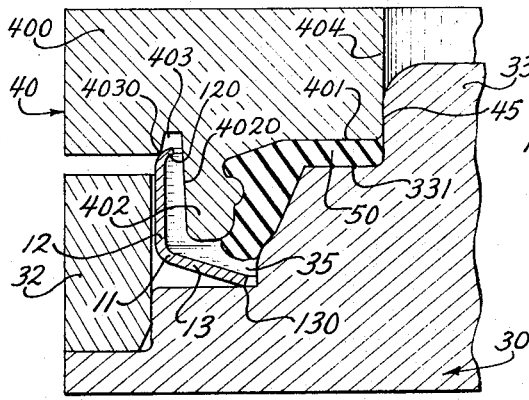
FIG. 4 is a view similar to FIG. 3 showing the initial partial closing of the movable molding die with the movable die in contact with the upper peripheral portion of the axially disposed shell element and with the mold cavity partially filled with moldable compound.

After the fixed die 30 is loaded as hereinabove set forth, the movable molding die 40 is moved downwardly over the fixed central guide stem 33 thereof as indicated in FIGS. 4–6 inclusive. The movable die 40 has a depending annular portion 400, and a flat annular press portion 401 disposed over the annular shelf 331 of the fixed die 30 to press upon the moldable material 50 thereon causing the said moldable material 50 to gradually fill the mold cavity 35 as the dies 30 and 40 are closed. The fixed die 30 and movable die 40 are so formed as to provide, when closed, the proper mold cavity 35 in which the sealing element 15 is molded. The movable die 40 is formed with a depending annular ring 402 which does not come into contact at any time with the annular shell 11, the said annular ring 402 being so formed at 4020 as to define the finished tapered shape of the anchorage flange 150 of the rubber sealing element 15, which, in the particular shaft seal 10 shown in FIG. 2 and molded as illustrated in FIGS. 3–6 inclusive, extends over the end of the curled portion 120 of the axially disposed flange 12 of the annular shell 11.

As best shown in FIG. 4, the portion 400 of the movable molding die 40 is provided with an annular reentrant groove 403 to accommodate the curled annular portion 120 of the axially disposed flange 12 of the annular shell 11 so that a lip 152 may be molded over the peripheral edge of the said curled portion 120 of the said axially disposed flange 12. The annular corner 4030 of the molding die 40 at the outer annular wall of the annular reentrant groove 403 therein contacts the said curled annular portion 120 of the axially disposed flange 12 of the shell 11 as the movable die 40 begins to close on the fixed die 30 during the molding operation. At this time the moldable material 50 has not as yet completely filled the mold cavity 35.

As the movable die 40 moves further toward its closed position three things happen: (a) the mold cavity is completely filled, (b) pressure of the moldable material 50 forces the axially disposed flange 12 of the shell 11 against the annular shell centering ring 32, and (c) the pressure of the corner 4030 of the molding die 40 on the curled portion 120 of the said axially disposed flange 12 plus the pressure of the moldable material 50 on the obtusely preformed radially disposed flange 13 causes the said flange 130 to begin to straighten, see FIG. 5. As the dies 30 and 40 are completely closed as shown in FIG. 6, the aforesaid pressures increase and the obtusely preformed radially disposed flange 13 of the annular shell 11 is straightened to a position normal or ninety degrees in respect to the said axially disposed flange 12 thereof.

During the closing of the dies 30 and 40, an excess 500 moldable material 50 escapes from the molding cavity 35 through a slight clearance 45 between the central guide stem 33 of the fixed die 30 and the inner annulus 404 of the depending annular portion 400 of the movable die 40. This clearance 45 is sufficiently slight as not to adversely effect the build-up of molding pressure within the die cavity 35 as the dies 30 and 40 are closed, the said molding pressure being sufficient not only to reform the obtusely preformed radially disposed flange 13 of the annular shell 11 but to assure a dense sealing element 15 after the curing thereof.

The line contact between the annular corner 4030 of the movable molding die 40 and the top of the inwardly curled annular portion 120 of the axially disposed flange 12 of the annular shell 11, and the line contact between the annular lower edge 130 of the obtusely preformed annular lower edge of the radially disposed annular flange 13 of the shell 11 assures that the fluid pressure of the moldable material 50 within the mold cavity 35 will prevent the forming of flash at NF–1 and NF–2 during molding. By providing the fixed die 30 with an annular groove 34 as shown in FIG. 7, the line contact between the obtusely formed radially disposed flange and the fixed die 30 during the closing of the dies 30 and 40 will be between the bottom of the said obtusely preformed radially disposed flange 13 and the annular edge 340 of the fixed die 30 at the said annular groove 34 provided therein.

Referring now to FIG. 8 which is similar to FIG. 6, the inwardly curled portion 120 of the axially disposed flange 12 has been omitted, and the annular edge 1200 thereof has been formed straight or flat, that is, normal to the said axially disposed flange 12. If such be the case, the annular reentrant groove 403 in the annular portion 400 of the movable die 40 shown in FIG. 4 would be omitted, and, as shown in FIG. 8, the said annular portion 400 of the movable die 40 would contact the straight or flat annular edge 1200 of the said axially disposed flange 12 of the annular shell 11 during the closing of the dies 30 and 40 and during the pressure curing of the sealing element 150 therein.

Although the method of making shaft seals of the invention has been disclosed in connection with the production of a single type of shaft seal and but one modification thereof, it is obvious that many different types and styles of shaft seals may be made in accordance with the method of the invention, and that the method steps may be modified accordingly, all without departing from the spirit and scope of the invention as defined by the appended claim.

I claim:

The method of flashless molding of a rubber or synthetic rubber shaft seal to the radially and axially disposed flanges of an annular metal shell in a die having a fixed and a movable element formed with the desired molding cavity therein comprising the steps of forming the radially disposed flange of the annular shell to an obtuse angle with respect to said annular axially disposed shell flange, placing the said shell in a molding die with the inner annular bottom of said obtusely disposed flange in shell-to-die contact with said fixed die element and with the axially disposed flange in substantial contact with said fixed die element, placing a charge of moldable material in said fixed die element, partially closing said die thereby bringing the movable element thereof in die-to-shell contact with the peripheral edge portion of said axially disposed flange of said annular shell and partially filling the mold cavity, continuing to close said die thereby reforming the obtusely disposed flange of said shell to its final radially disposed position, applying die pressure during the completion of the closing of the said die to the peripheral edge portion of the axially disposed flange of said shell and simultaneously applying fluid pressure of said moldable material created within the die cavity during the closing thereof to the inner faces of said radially and axially disposed shell flanges whereby to eliminate flash during the molding of the said shaft seal to the axial and annular flanges of said shell to the extent that no flash trimming is required, and curing said shaft seal under said molding pressure.

References Cited by the Examiner
UNITED STATES PATENTS 3,004,298   10/1961   Haynie _____ 264—276
3,090,996   5/1963   Reichenbach et al. ____ 29—527

JOHN F. CAMPBELL, *Primary Examiner.*

WHITMORE A. WILTZ, *Examiner.*

P. M. COHEN, *Assistant Examiner.*